No. 802,362. PATENTED OCT. 17, 1905.
J. M. GREEN, D. E. LYONS & A. T. GAREY.
ANTIFRICTION BEARING.
APPLICATION FILED MAR. 22, 1905.
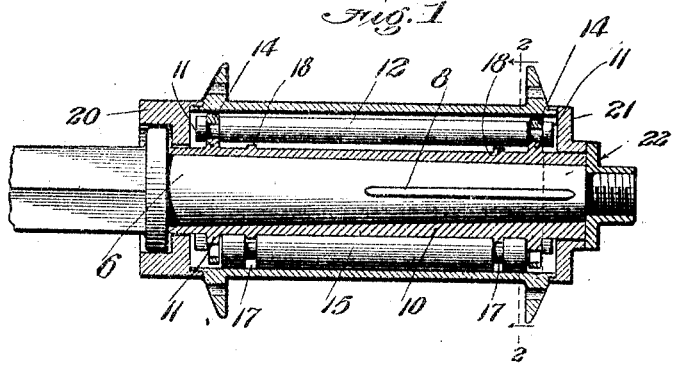
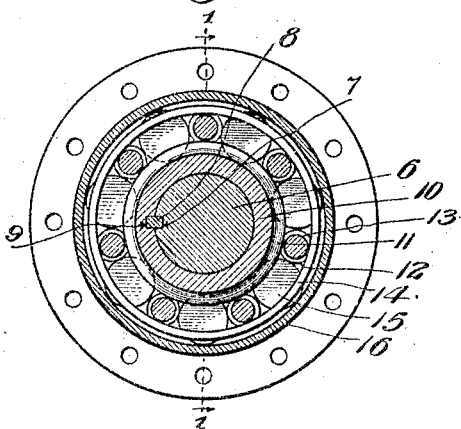
Witnesses
Inventors
John M. Green
David E. Lyons
Andrew T. Garey
by Hazard & Harpham
Attorneys

UNITED STATES PATENT OFFICE.

JOHN M. GREEN, DAVID E. LYONS, AND ANDREW T. GAREY, OF LOS ANGELES, CALIFORNIA.

ANTIFRICTION-BEARING.

No. 802,362.　　　Specification of Letters Patent.　　　Patented Oct. 17, 1905.

Application filed March 22, 1905. Serial No. 251,499.

*To all whom it may concern:*

Be it known that we, JOHN M. GREEN, DAVID E. LYONS, and ANDREW T. GAREY, citizens of the United States, residing at Los Angeles, in the county of Los Angeles and State of California, have invented new and useful Improvements in Antifriction-Bearings, of which the following is a specification.

Our invention relates to improvements in the construction of the rollers of the bearing and supports therefor and in the spacer-supports and in the assembling-rings; and the objects thereof are to provide a roller-bearing in which the bearing-rollers and spacers therefor will be evenly held and to simplify the construction of the supports therefor.

In the drawings forming a part of this application we have illustrated our invention as applied to an axle and wheel, the box of the wheel only being shown; but our invention is equally applicable to bearings where one part is rotatable within or exterior to the other part.

In the drawings, Figure 1 is a longitudinal section on the line 1 1 of Fig. 2. Fig. 2 is a cross-section on the line 2 2 of Fig. 1.

In the drawings the axle 6 may be either tapered, as shown in the drawings, or straight. On one side it is provided with the keyway 7 for the reception of the key 8, which key fits in a like way 9 in sleeve 10 to prevent the sleeve from rotating upon the axle. The way in the sleeve extends to the rear end thereof, so that the sleeve may be slipped on the axle with the key in place in the axle. The sleeve is provided near the extreme ends thereof with annular flanges 11, integral with the sleeve, which flanges support and hold in place against lateral movement the spacing-rollers 12, which are provided at each end with a groove 13, in which the flanges of the sleeve rest, said spacing-rollers being supported by the flanges at their reduced portion formed by said grooves. Assembling-rings 14 fit into the outer sides of these grooves to hold the spacers while the parts are being assembled, as hereinafter explained.

The bearing-rollers 15, which engage the sleeve, and the box 16 of the hub are constructed of a length to fit within the spacer-supporting flanges of the sleeve. Near each end of these bearing-rollers we have provided grooves 17, which fit over flanges 18 of the sleeve. These grooves are so deep that the reduced portion of the bearing-roller at these grooves does not rest upon the top of the flange; but both sides of the groove contact with both sides of the flange to prevent any end thrust of the bearing-roller and to keep the longitudinal axis of the bearing-roller always parallel with the longitudinal axis of the axle.

In assembling the parts the spacing-rollers would be slipped into the assembling-rings, which could rest upon a bench. The sleeve would then be slipped into the spacing-rings to bring the flanges thereon into register with the grooves in the spacing-rollers. The bearing-rollers would then be inserted one between each pair of spacing-rollers, being held in position by the hand or an expansible band. After all of the bearing-rollers were in position the assembled parts would be slipped into the hub, when the dust-caps 20 and 21 would be screwed upon the ends of the hub, after which the same would be slipped upon the axle and the retaining-nut 22 screwed onto the end of the axle, when the wheel would be in place.

Having described our invention, what we claim as new, and desire to secure by Letters Patent, is—

1. In an antifriction-bearing the combination of a sleeve provided with a plurality of peripheral annular flanges near the ends thereof, there being two of such flanges near each end, the outer flanges being higher than the intermediate flanges; bearing-rollers intermediate said outer flanges, said bearing-rollers having grooves near the ends thereof which straddle the lower flanges or intermediate flanges of the sleeve without being supported by said flanges; and spacing-rollers intermediate said bearing-rollers, said spacing-rollers extending over the flanges without touching the intermediate flanges and having grooves fitting over the outer flanges and being supported by said flanges.

2. In a bearing an inner member having a plurality of separated annular flanges near the ends thereof, there being two of such flanges near each end, the outer flanges being higher than the intermediate flanges; bearing-rollers intermediate said outer flanges, said bearing-rollers having grooves near the ends thereof which straddle the intermediate flanges without being supported thereby; spacing-rollers intermediate said bearing-rollers and extending over without touching the intermediate flanges and extending over the outer flanges and having grooves fitting over the outer flanges, said spacing-rollers being supported by said outer flanges; and an outer member adapted to slip over the inner member and said rollers and engage the bearing-rollers without contacting with the spacing-rollers.

In witness that we claim the foregoing we have hereunto subscribed our names this 11th day of March, 1905.

JOHN M. GREEN.
DAVID E. LYONS.
ANDREW T. GAREY.

Witnesses:
G. E. HARPHAM,
EDMUND A. STRAUSE.